(12) United States Patent
Hu et al.

(10) Patent No.: US 11,855,764 B2
(45) Date of Patent: Dec. 26, 2023

(54) PORT MODE ADAPTATION METHOD AND APPARATUS

(71) Applicant: Huawei Technologies Co., Ltd., Shenzhen (CN)

(72) Inventors: Yongjian Hu, Dongguan (CN); Yanwen Xiang, Dongguan (CN); Wei Xue, Dongguan (CN); Ke Yi, Dongguan (CN); Jiadao Wei, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 184 days.

(21) Appl. No.: 17/474,678

(22) Filed: Sep. 14, 2021

(65) Prior Publication Data

US 2021/0409236 A1    Dec. 30, 2021

Related U.S. Application Data

(63) Continuation of application No. PCT/CN2020/101624, filed on Jul. 13, 2020.

(30) Foreign Application Priority Data

Jul. 12, 2019 (CN) .......................... 201910631755.4

(51) Int. Cl.
*H04L 12/28* (2006.01)
(52) U.S. Cl.
CPC .................................... *H04L 12/28* (2013.01)
(58) Field of Classification Search
CPC ...................................................... H04L 12/28
See application file for complete search history.

(56) References Cited

U.S. PATENT DOCUMENTS

2014/0280791 A1    9/2014  Casimer et al.
2018/0013511 A1*   1/2018  Hussain ............ G02B 6/12033
(Continued)

FOREIGN PATENT DOCUMENTS

CN    101350823 A    1/2009
CN    103222251 A    7/2013
(Continued)

OTHER PUBLICATIONS

Katsalis, K., "Towards Slicing for Transport Networks: The Case of Flex-Ethernet in 5G," IEEE Conference on Standards for Communications and Networking (CSCN), Oct. 29, 2018, 8 pages, XP033480448.

(Continued)

*Primary Examiner* — Kent Krueger
(74) *Attorney, Agent, or Firm* — Conley Rose, P.C.

(57) ABSTRACT

A port mode adaptation method includes a network device determining a status of a port on the network device. The method includes the network device setting a mode of the port to an Ethernet interface mode if the status of the port satisfies a first condition. In this way, when the network device identifies the mode of the port on the network device as the FlexE interface mode, and there is no link at the FlexE shim of the port, the network device may determine that a mode used by a port interconnected with the port is not a FlexE interface mode. In this case, the network device may adaptively set the mode of the port to the Ethernet interface mode, to ensure that the port on the network device can use a same mode as another port interconnected with the port.

20 Claims, 10 Drawing Sheets

(56) References Cited

U.S. PATENT DOCUMENTS

2020/0162586 A1    5/2020  Li et al.
2021/0091871 A1*   3/2021  Deng ................. H04L 12/2823
2021/0320819 A1*  10/2021  Chen .................... H04L 45/745

FOREIGN PATENT DOCUMENTS

CN        109302372 A    2/2019
CN        109672513 A    4/2019

OTHER PUBLICATIONS

IEEE Std 802.3TM, "IEEE Standard for Ethernet," LAN/MAN Standards Committee of the, IEEE Computer Society, 2015, 5600 pages.
"Flex Ethernet Implementation Agreement," IA OIF-FLEXE-01.0, Mar. 2016, 31 pages.
"Flex Ethernet 2.0 Implementation Agreement," IA OIF-FLEXE-02.0, Jun. 22, 2018, 51 pages.

* cited by examiner

PORT MODE ADAPTATION METHOD AND APPARATUS

CROSS-REFERENCE TO RELATED APPLICATIONS

This application is a continuation of International Patent Application No. PCT/CN2020/101624 filed on Jul. 13, 2020, which claims priority to Chinese Patent Application No. 201910631755.4 filed on Jul. 12, 2019. The disclosures of the aforementioned applications are hereby incorporated by reference in their entireties.

TECHNICAL FIELD

This application relates to the field of communications technologies, and in particular, to a port mode adaptation method and apparatus.

BACKGROUND

When a network device is deployed in a network, it is usually required that the network device should be capable of automatically communicating with another network device. In this case, after being installed and powered on, the network device can be automatically identified by a network management center, so that the network management center can manage the network device. However, if interconnected ports on two network devices use different modes, for example, if a common Ethernet interface that is on one network device and that is defined in the IEEE 802.3 standard interconnects with a Flexible Ethernet (FlexE) interface that is on the other network device and that is defined in the Optical Internetworking Forum (OIF) FlexE 1.0 or 2.0 standard, the two network devices cannot communicate with each other.

SUMMARY

In view of this, embodiments of this application provide a port mode adaptation method and apparatus, so that a port on a network device can adaptively use a same mode as an interconnected port, and therefore the network device can automatically communicate with another network device.

According to a first aspect, an embodiment of this application provides a port mode adaptation method. When a network device is deployed in a network, a process of implementing port mode adaptation by using the method may specifically include: A network device determines a status of a port on the network device. The status of the port may include: a mode of the port, and whether there is a link at a FlexE shim of the port. The network device determines whether the status of the port satisfies a first condition; and sets the mode of the port to an Ethernet interface mode if the status of the port satisfies the first condition. The first condition includes: the mode of the port is a FlexE interface mode, and there is no link at the FlexE shim of the port. In this way, when the network device identifies the mode of the port on the network device as the FlexE interface mode, and determines that there is no link at the FlexE shim of the port, the network device may determine that a mode used by a port interconnected with the port is not a FlexE interface mode. In this case, the network device may adaptively set the mode of the port to the Ethernet interface mode, to ensure that the port on the network device can use a same mode as another port interconnected with the port, so that two adjacent network devices can automatically communicate with each other, that is, both the two network devices can implement automatic communication. If a peer end is a network management device, the network management device can automatically identify and manage the network device that can implement automatic communication. Therefore, the port mode adaptation method provided in this embodiment of this application ensures that the network device can implement automatic communication, so that the network management device can automatically identify and manage the network device.

With reference to some specific embodiments of the first aspect, the first condition may further include: a link has been established at a physical coding sublayer (PCS) of the port. In this way, the network device can contrast the detected status of the port with the first condition, to further determine that the port is connected to another network device and that the port interconnected with the port is in the Ethernet interface mode, that is, a port B is communicating with a port A through an Ethernet interface. In this case, the mode of the port is adaptively adjusted to the Ethernet interface mode. Therefore, the port mode adaptation method provided in this embodiment of this application is more accurate.

With reference to some other specific embodiments of the first aspect, the method may further include: The network device switches the mode of the port from the Ethernet interface mode to the FlexE interface mode if the status of the port satisfies a second condition. The second condition includes: the mode of the port is the Ethernet interface mode, and there is no link at the PCS of the port. In this way, after setting the mode of the port to the Ethernet interface mode based on the status of the port, the network device may continue to determine, based on the status of the port, whether the port is connected to another network device; and when the port is not connected to another network device, adaptively switch the mode of the port back to a default mode, that is, the FlexE interface mode. This adaptively adjusts the mode of the port on the network device flexibly.

It can be understood that the first condition may further include: the port is in an adaptive state, and the second condition may further include: the port is in the adaptive state. The adaptive state of the port is a state in which the network device can adaptively adjust the mode of the port. In one example, the method may further include: The network device receives a first configuration instruction, and sets the status of the port to the adaptive state according to the first configuration instruction.

With reference to still some other specific embodiments, the method may further include: The network device locks the mode of the port to a fixed mode according to another configuration instruction. In one example, the method may further include: The network device receives a second configuration instruction, sets the status of the port to a first locked state according to the second configuration instruction, and locks the mode of the port to the FlexE interface mode when the port is in the first locked state. In another example, the method may further include: The network device receives a third configuration instruction, sets the status of the port to a second locked state according to the third configuration instruction, and locks the mode of the port to the Ethernet interface mode when the port is in the second locked state. It can be understood that the first locked state may be a state in which the network device locks the mode of the port to the FlexE interface mode and cannot perform adaptive adjustment, and the second locked state may be a state in which the network device locks the mode of the port to the Ethernet interface mode and cannot perform adaptive adjustment. In this way, according to the method provided in this embodiment of this application, the mode of the port can further be locked, according to a configuration instruction, to a port mode corresponding to a locked state of the port, to lock the mode of the port to the FlexE interface mode or the Ethernet interface mode.

With reference to yet some other specific embodiments of the first aspect, the method may further include: The network device sets the mode of the port to a specific mode by using a forced configuration performed by technical personnel. In one example, the method may further include: The network device receives a fourth configuration instruction, and sets the mode of the port to the Ethernet interface mode according to the fourth configuration instruction. In another example, the method may further include: The network device receives a fifth configuration instruction, and sets the mode of the port to the FlexE interface mode according to the fifth configuration instruction. In this way, according to the method provided in this embodiment of this application, the mode of the port can further be set to the FlexE interface mode or the Ethernet interface mode by using the forced configuration performed by the technical personnel.

According to a second aspect, an embodiment of this application further provides a port mode adaptation apparatus. In this solution, the apparatus includes a determining unit and a first setting unit. The determining unit is configured to determine a status of a port on the network device. The first setting unit is configured to set a mode of the port to an Ethernet interface mode if the status of the port satisfies a first condition. The first condition includes: the mode of the port is a Flexible Ethernet FlexE interface mode, and there is no link at a FlexE shim of the port.

With reference to some specific embodiments of the second aspect, the first condition further includes: a link has been established at a PCS of the port.

With reference to some other specific embodiments of the second aspect, the apparatus further includes a switching unit. The switching unit is configured to switch the mode of the port from the Ethernet interface mode to the FlexE interface mode if the status of the port satisfies a second condition. The second condition includes: the mode of the port is the Ethernet interface mode, and there is no link at the PCS of the port.

With reference to still some other specific embodiments of the second aspect, the first condition further includes: the port is in an adaptive state, and the second condition further includes: the port is in the adaptive state.

With reference to yet some other specific embodiments of the second aspect, the apparatus further includes a first receiving unit and a second setting unit. The first receiving unit is configured to receive a first configuration instruction. The second setting unit is configured to set the status of the port to the adaptive state according to the first configuration instruction.

With reference to some other specific embodiments of the second aspect, the apparatus further includes a second receiving unit, a third setting unit, and a first locking unit. The second receiving unit is configured to receive a second configuration instruction. The third setting unit is configured to set the status of the port to a first locked state according to the second configuration instruction. The first locking unit is configured to lock the mode of the port to the FlexE interface mode when the port is in the first locked state.

With reference to some other specific embodiments of the second aspect, the apparatus further includes a third receiving unit, a fourth setting unit, and a second locking unit. The third receiving unit is configured to receive a third configuration instruction. The fourth setting unit is configured to set the status of the port to a second locked state according to the third configuration instruction. The second locking unit is configured to lock the mode of the port to the Ethernet interface mode when the port is in the second locked state.

With reference to some other specific embodiments of the second aspect, the apparatus further includes a fourth receiving unit and a first configuration unit. The fourth receiving unit is configured to receive a fourth configuration instruction. The first configuration unit is configured to set the mode of the port to the Ethernet interface mode according to the fourth configuration instruction.

With reference to some other specific embodiments of the second aspect, the apparatus further includes a fifth receiving unit and a second configuration unit. The fifth receiving unit is configured to receive a fifth configuration instruction. The second configuration unit is configured to set the mode of the port to the FlexE interface mode according to the fifth configuration instruction.

It should be noted that the apparatus provided in the second aspect is corresponding to the method provided in the first aspect. Therefore, for the possible implementations and technical effects of the apparatus provided in the second aspect, refer to the description of the method provided in the first aspect.

According to a third aspect, an embodiment of this application further provides a network device. The network device includes a memory and a processor. The memory is configured to store program code. The processor is configured to run instructions in the program code, to enable the network device to perform any one of the foregoing methods.

According to a fourth aspect, an embodiment of this application further provides a computer program product. When the computer program product is run on a computer, the computer is enabled to perform any one of the foregoing methods.

According to a fifth aspect, an embodiment of this application further provides a computer-readable storage medium. The computer-readable storage medium stores instructions. When the instructions are run on a computer or a processor, the computer or the processor is enabled to perform any one of the foregoing methods.

BRIEF DESCRIPTION OF DRAWINGS

To describe technical solutions in the embodiments of this application more clearly, the following briefly describes the accompanying drawings. The accompanying drawings in the following descriptions show merely some embodiments of this application, and a person of ordinary skill in the art may still derive other drawings from these accompanying drawings.

DESCRIPTION OF EMBODIMENTS

Figure 1:
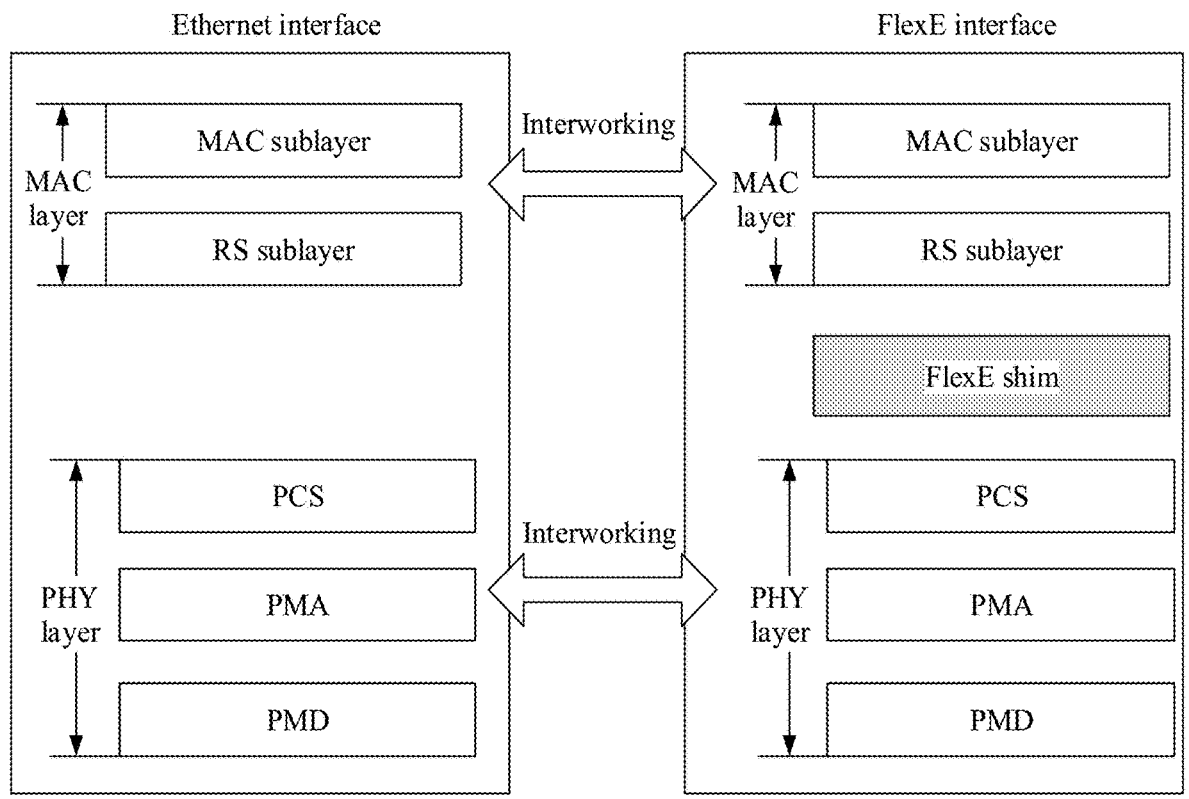
FIG. 1 is a schematic framework diagram of interfaces corresponding to two port modes according to an embodiment of this application.

At present, a network device can support a common Ethernet interface defined in the IEEE 802.3 standard and a FlexE interface defined in the Optical Internet Forum OIF FlexE 1.0 or 2.0 standard. The FlexE interface is an interface type that is extended based on the IEEE 802.3 standard and that supports a FlexE-related function such as a FlexE interface channelization function, a bandwidth binding function, or a sub-rate unique function. Currently, network devices corresponding to product lines such as a packet transport network (PTN) and an Internet Protocol radio access network (IP RAN) support a FlexE interface mode. Network devices mentioned in the embodiments of this application are all considered as network devices supporting the FlexE interface mode. A peer network device may be a network device supporting the FlexE interface mode or a network device supporting a common Ethernet interface mode.

In this application, the network device may include one or more Ethernet interfaces. In the following embodiments, unless otherwise specified particularly, a FlexE-capable port on the network device is used as an example for description. The FlexE-capable port can support interface mode adaptive adjustment. In some embodiments, one or more of the other FlexE-capable ports may also support interface mode adaptive adjustment. In some embodiments, one or more of the other FlexE-capable ports may alternatively not support interface mode adaptive adjustment.

It can be understood that related concepts of the FlexE interface are described as follows.

FlexE is an interface technology for implementing service bearer isolation and network slicing in a bearer network. FlexE slicing is used to divide a physical Ethernet interface into a plurality of Ethernet elastic hard pipes based on timeslot scheduling, so that the network features exclusive timeslots and desirable isolation that are similar to those of time-division multiplexing (TDM), and also features Ethernet statistical multiplexing and high network efficiency. In this way, statistical multiplexing of services in a same slice is implemented, and services between slices do not affect each other. Compared with a virtual private network (VPN), such a network implements better slice isolation, and provides more options for $5^{th}$ generation (5G) network slicing.

A FlexE client is used to indicate a service customer borne by a FlexE network. Currently, the FlexE client is defined as an Ethernet packet service flow in the OIF FlexE 1.0 or 2.0 standard, and can be extended to support service types such as a TDM service and a Common Public Radio Interface (CPRI) service.

A FlexE shim is a service layer at which mapping or demapping is performed for a FlexE client. The FlexE client is borne by the FlexE shim, and the FlexE shim performs transmission by using a FlexE group.

A FlexE group is a FlexE protocol group including one PHY or a plurality of PHYs with a same group number, and provides a uniform underlying service for the FlexE shim.

FIG. 1 is a schematic architectural diagram of an Ethernet interface and a FlexE interface. Referring to FIG. 1, the Ethernet interface includes a media access control (MAC) layer and a physical layer (PHY). The MAC layer includes a reconciliation sublayer (RS) and a MAC sublayer. The PHY layer includes a PCS, a physical medium attachment (PMA) sublayer, and a physical medium dependent (PMD) sublayer. Referring to FIG. 1, in a FlexE interface technology, a FlexE shim is added between the PHY layer and the MAC layer of the Ethernet interface, to implement a FlexE interface-related function.

When a network device is deployed in a network, it is required that each network device should be capable of going online by using automatically available data communications network (DCN). In this case, after being installed and powered on, each network device can be automatically identified by a network management center, so that the network management center can manage each network device. That the network device goes online by using automatically available DCN means that the network device can automatically perform DCN packet communication with an adjacent network device. However, when network devices respectively support the Ethernet interface and the FlexE interface, referring to FIG. 1, because the Ethernet interface does not have a FlexE shim, two network devices whose modes of interconnected ports are respectively an Ethernet interface mode and a FlexE interface mode cannot implement automatic communication above the PHY layer. To enable both of the two network devices to automatically communicate with another network device, the interconnected ports on the two network devices need to use a same mode. For example, the modes of the interconnected ports on the two network devices are both Ethernet interface modes, or the modes of the interconnected ports on the two network devices are both FlexE interface modes.

However, as more network devices are deployed in the network, it cannot be ensured that port modes of the network devices can automatically keep consistent. To avoid a problem that the network cannot normally run because a mode of a port on a network device is inconsistent with a mode of an interconnected port, technical personnel usually need to set the port modes of the network devices one by one, so that a mode of a port on each network device is consistent with a mode of an interconnected port, to ensure that each network device can implement automatic communication, thereby ensuring normal running of the network. As a result, a large quantity of manpower, material resources, and time costs need to be consumed.

Figure 2:
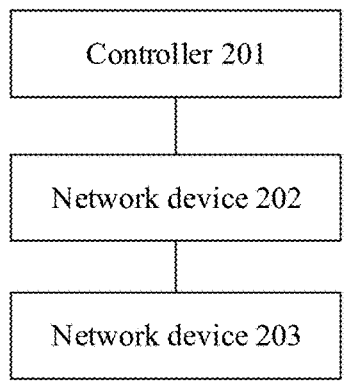
FIG. 2 is a schematic structural diagram of a network in an application scenario according to an embodiment of this application.

For example, referring to a schematic architectural diagram of a network shown in FIG. 2, the network includes a controller 201, a network device 202, and a network device 203. The controller 201 may be a device having a network management function. The controller 201 is connected to a port 2 on the network device 202 through a port 1 on the controller 201, and the network device 202 is connected to a port 4 on the network device 203 through a port 3 on the network device 202. The controller 201 may alternatively be another device having a network management function, for example, a network management device.

A scenario shown in FIG. 2 is used as an example for describing a process of setting, by network devices, port modes of the network devices one by one. It is assumed that current modes of the port 3 and the port 4 are both Ethernet interface modes. Because both the network device 202 and the network device 203 can support a FlexE interface, to implement a FlexE interface-related function (for example, to make the network capable of implementing a packet service), the port modes of the network device 202 and the network device 203 need to be switched to FlexE interface modes. A switching process may include: S11. Technical personnel manually determine that current interconnected ports on the network device 202 and the network device 203 are respectively the port 3 and the port 4, and that the modes of the port 3 and the port 4 are both Ethernet interface modes. S12. The technical personnel determine, based on a structure of the network, that the network device 202 in the network is an upstream network element and that the network device 203 in the network is a downstream network element. S13. To enable the interconnected ports on the network device 202 and the network device 203 to be switched to FlexE interfaces, the technical personnel need to configure, on the controller 201, a policy for first performing switching on a port on a downstream network element and then performing switching on a port on an upstream network element. The policy is used to instruct that the port 4 on the network device 203 is first switched and then the port 3 on the network device 202 is switched. In this way, after a NCE or other device such as a network management device first instructs the downstream network element (that is, the network device 203 in FIG. 2) to switch the port 4 to the FlexE interface, although the downstream network element (that is, the network device 203 in FIG. 2) cannot communicate with the controller 201 because the downstream network element and the interconnected port 3 on the upstream network element (that is, the network device 202 in FIG. 2) use different modes, the upstream network element (that is, the network device 202 in FIG. 2) can still communicate with another device in the network. Therefore, the controller 201 may further instruct the upstream network element (that is, the network device 202 in FIG. 2) to switch the port 3 to the FlexE interface. S14. The controller 201 sends an instruction 1 to the network device 203 by using the network device 202, to instruct the network device 203 to switch the mode of the port 4 to the FlexE interface mode. S15. The controller 201 sends an instruction 2 to the network device 202, to instruct the network device 202 to switch the mode of the port 3 to the FlexE interface mode. In this way, the interconnected-port modes of the network device 202 and the network device 203 whose port modes are both the Ethernet interface modes are switched to the FlexE interface modes, so that the network device 202 and the network device 203 can implement automatic communication.

However, in the manner in which port modes of network devices are set one by one to ensure that the network devices can implement automatic communication, it is necessary to manually determine current interconnected ports and modes of the ports, manually determine an upstream-downstream relationship between network elements, and manually configure, on a network management center, a policy for switching port modes. This causes heavy network operation and maintenance workloads, and also requires a large quantity of operations such as manual judgments and configurations. Consequently, an error probability is relatively high. Once upstream and downstream network elements are incorrectly determined, a mode of a downstream port on the upstream network element is switched by mistake. As a result, the downstream network element cannot receive an instruction for switching a mode of an upstream port on the downstream network element and cannot implement automatic communication.

In view of this, an embodiment of this application provides a port mode adaptation method. When a network device identifies a mode of a port on the network device as a FlexE interface mode, and determines that there is no link at a FlexE shim of the port, the network device may determine that a mode used by a port interconnected with the port is not a FlexE interface mode. In this case, the network device may adaptively set the mode of the port to an Ethernet interface mode, to ensure that the port on the network device can use a same mode as another port interconnected with the port, so that both of two network devices can automatically communicate with another network device, that is, both the two network devices can implement automatic communication. Therefore, a network management center can automatically identify and manage the network device.

The network shown in FIG. 2 is still used as an example. It is assumed that the mode of the port 3 is a FlexE interface mode and the mode of the port 4 is an Ethernet interface mode. Based on this embodiment of this application, a network device 202 may detect a status of the port 3. To be specific, the mode of the port is a FlexE interface mode and there is no link at a FlexE shim of the port 3. In this case, the network device 202 may determine that the port 4, on the network device 203, interconnected with the port 3 does not use a FlexE interface mode. Then, the network device 202 may automatically set the mode of the port 3 on the network device 202 to an Ethernet interface mode, to ensure that a same port mode is maintained between the network device 202 and the network device 203 adjacent to the network device 202.

The following details specific implementations of port mode adaptation methods and apparatuses in the embodiments of this application with reference to the accompanying drawings by using embodiments.

Figure 3:
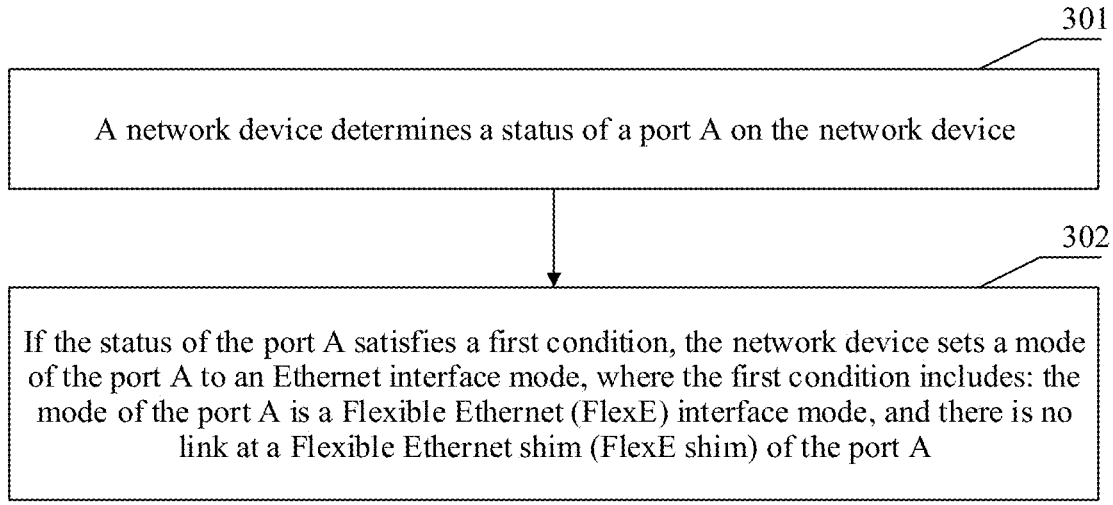
FIG. 3 is a schematic flowchart of a port mode adaptation method according to an embodiment of this application.

FIG. 3 is a schematic flowchart of a port mode adaptation method according to an embodiment of this application. It should be noted that the embodiment shown in FIG. 3 can be applied to the network architecture shown in FIG. 2, and the network device 202 and the network device 203 that are shown in FIG. 2 separately perform steps in the method shown in FIG. 3. It can be understood that because there is no FlexE shim when a mode of a port on a network device is an Ethernet interface mode, the network device cannot detect whether there is a link at a FlexE shim of the port, and cannot determine whether a mode of an interconnected port is a FlexE interface mode. However, when the mode of the port on the network device is a FlexE interface mode, the network device can detect whether there is a link at the FlexE shim of the port, and can determine whether the mode of the interconnected port is an Ethernet interface mode. Therefore, to effectively implement port mode adaptation, the network device in this embodiment of this application may set a default port mode of the network device to the FlexE interface mode, so that the network device can automatically determine the mode of the interconnected port and perform effective port mode adaptation switching.

During specific implementation, the method may include, for example, the following steps.

Step 301: A network device determines a status of a port A on the network device.

Assuming that the network device includes a FlexE-capable port such as a port A, the network device may detect a status of the port A on the network device. The status of the port A may include at least: a current mode of the port A, and whether there is a link at a FlexE shim of the port A. The port A may consider by default that the mode of the port A is a FlexE interface mode.

In one example, the network device may perform detection to determine whether there is a link at the FlexE shim of the port A on the network device. If there is a link at the FlexE shim of the port A, the status that is of the port A on the network device and that is determined by the network device may include: there is a link at the FlexE shim. If there is no link at the FlexE shim of the port A, the status that is of the port on the network device and that is determined by the network device may include: there is no link at the FlexE shim.

Step 302: If the status of the port A satisfies a first condition, the network device sets the mode of the port A to an Ethernet interface mode, where the first condition includes: the mode of the port A is the Flexible Ethernet FlexE interface mode, and there is no link at the FlexE shim of the port A.

It can be understood that in the first condition, the mode of the port A may be preset on the network device. The first condition is one of conditions used for indicating to perform mode adaptive adjustment on the port A on the network device, and may specifically be used as a condition for adjusting the mode of the port on the network device from the FlexE interface mode to the Ethernet interface mode.

During specific implementation, if the status that is of the port A and that is determined in step 301 includes: there is a link at the FlexE shim, it may be determined that a port B interconnected with the port A also includes a FlexE shim, that is, it may be determined that a mode of the interconnected port B is also a FlexE interface mode. In this case, the network device determines the mode of the port A on the network device does not need to be changed. If the status that is of the port A and that is determined in step 301 includes: there is no link at the FlexE shim, it may be determined that a port B interconnected with the port A is in an Ethernet interface mode, that is, the port B is communicating with the port A through an Ethernet interface. In this case, the network device may adaptively set the mode of the port A on the network device to the Ethernet interface mode, so that the network device can implement automatic communication.

When the mode of the port A is the FlexE interface mode, the network device may determine, based on whether a signal sent by the port B is received at the FlexE shim of the port A, whether there is a link at the FlexE shim of the port A. If the network device receives, at the FlexE shim of the port A, the signal sent by the port B interconnected with the port A, the network device may determine that there is a link at the FlexE shim of the port A. If the network device does not receive, at the FlexE shim of the port A, the signal sent by the port B interconnected with the port A, the network device may determine that there is no link at the FlexE shim of the port A.

In one example, the status that is of the port A and that is determined in step 301 may further include: whether a link has been established at a PCS of the port A; in this case, the first condition may further include: the link has been established at the PCS of the port A. In this example, in one case, if the determined status of the port A includes: there is no link at the FlexE shim and there is a link at the PCS, it may be determined that there is a network device connected to the port A and that the port B interconnected with the port A is in the Ethernet interface mode, that is, the port B is communicating with the port A through the Ethernet interface. In other words, it is determined that the mode of the port B interconnected with the port A is not the FlexE interface mode. In this case, the network device may adaptively set the mode of the port A on the network device to the Ethernet interface mode. In another case, if the status of the port A includes: there is no link at the FlexE shim and there is no link at the PCS, it may be determined that the port A is not connected to another network device. In this case, the network device may adaptively set the mode of the port A on the network device to the Ethernet interface mode, or may not change the mode of the port A.

The network device may determine, by determining whether a capability negotiation signal sent by the peer end is received at the PCS of the port A, whether a link has been established at the PCS of the port A. When the network device receives, at the PCS of the port A, the capability negotiation signal sent by the port B interconnected with the port A, the network device may determine that a link has been established with the port B at the PCS of the port A. If the network device does not receive, at the PCS of the port A, the capability negotiation signal sent by the peer port, the network device may determine that there is no link at the PCS of the port A. It can be learnt that, according to the port mode adaptation method provided in this embodiment of this application, when the network device determines that the mode of the port A on the network device is the FlexE interface mode, and determines that there is no link at the FlexE shim of the port A, the network device may determine that the mode used by the port B interconnected with the port A is not the FlexE interface mode. In this case, the network device adaptively sets the mode of the port A to the Ethernet interface mode, to ensure that the port A on the network device can use a same mode as the port B interconnected with the port A, so that the network device can automatically communicate with another device. When a peer device is a network management device, the network management device can automatically identify and manage the network device in a network.

Figure 4:
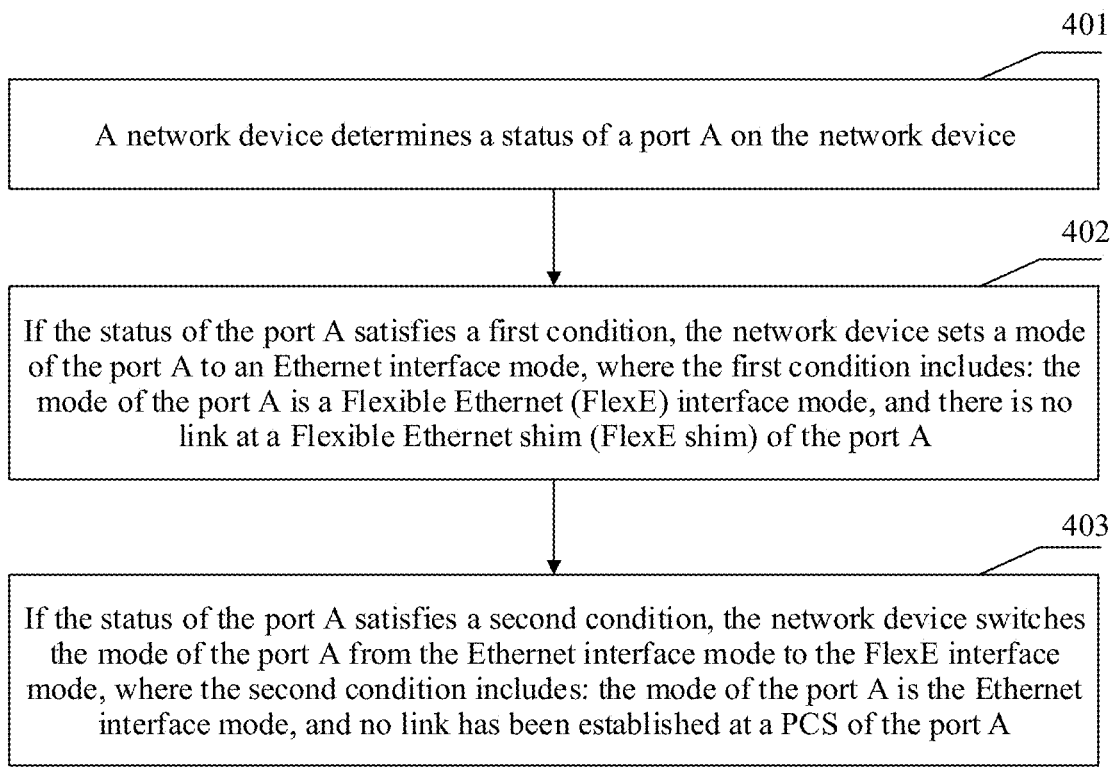
FIG. 4 is a schematic flowchart of another port mode adaptation method according to an embodiment of this application.

In some specific specifications, the status that is of the port A and that is determined in step 301 includes: the current mode of the port A, whether there is a link at the FlexE shim of the port A, and whether there is a link at the PCS of the port A. In this case, during specific implementation, as shown in FIG. 4, an embodiment of this application may specifically include the following steps:

Step 401: A network device determines a status of a port A on the network device.

Step 402: If the status of the port A satisfies a first condition, the network device sets a mode of the port A to an Ethernet interface mode, where the first condition includes: the mode of the port A is a FlexE interface mode, there is no link at a FlexE shim of the port A, and a link has been established at a PCS of the port A.

Step 403: If the status of the port A satisfies a second condition, the network device switches the mode of the port A from the Ethernet interface mode to the FlexE interface mode, where the second condition includes: the mode of the port A is the Ethernet interface mode, and no link has been established at the PCS of the port A.

For specific implementations of step 401 and step 402 and effects thereof, refer to related descriptions of step 301 and step 302 in the embodiment shown in FIG. 3.

It can be understood that in the second condition, the mode of the port A may be preset on the network device. The second condition is one of conditions used for indicating to perform mode adaptive adjustment on the port on the network device, and may specifically be used as a condition for adjusting the mode of the port on the network device from the Ethernet interface mode to the FlexE interface mode.

During specific implementation, after setting the mode of the port A on the network device to the Ethernet interface mode by using step 401 and step 402, the network device may further determine whether the status of the port A satisfies the second condition. In one case, if the status of the port A includes: there is no link at the PCS, it may be determined that the port A is not connected to another network device. In this case, the network device may adaptively switch the mode of the port A on the network device back to a default port mode, that is, the FlexE interface mode.

It can be learnt that, according to the port mode adaptation method provided in this embodiment of this application, when the network device identifies the mode of the port A on the network device as the FlexE interface mode, and determines that there is a link at the PCS of the port A and there is no link at the FlexE shim of the port A, the network device may determine that a mode used by a port B interconnected with the port A is not a FlexE interface mode. In this case, the network device adaptively sets the mode of the port A to the Ethernet interface mode. When the mode of the port on the network device is the Ethernet interface mode, and the network device detects that there is no link at the PCS of the port A, the network device determines that the network device is not connected to another network device through the port A, and then automatically switches the mode of the port A back to the default mode, that is, the FlexE interface mode. In this way, the mode of the port on the network device can be adaptively adjusted flexibly, to ensure that the port A on the network device can use a same mode as the port B interconnected with the port A, so that the network device can automatically communicate with another network device. When a peer device is a network management device, the network management device can automatically identify and manage the network device in a network.

In some other specific implementations, in this embodiment of this application, the status of the port A on the network device may further be set to an adaptive state, a first locked state, or a second locked state through configuration. The adaptive state of the port A is a state in which the network device can adaptively adjust the mode of the port A. The first locked state is a state in which the network device locks the mode of the port A to the FlexE interface mode and cannot perform adaptive adjustment. The second locked state is a state in which the network device locks the mode of the port A to the Ethernet interface mode and cannot perform adaptive adjustment. The three states can be switched by using a configuration instruction.

In the embodiments shown in FIG. 3 and FIG. 4, the status that is of the port A and that is determined by the network device may further include: whether the port A is in an adaptive state. The first condition further includes: the port A is in the adaptive state, and the second condition further includes: the port A is in the adaptive state. In other words, both the embodiments shown in FIG. 3 and FIG. 4 describe a process of performing port mode adaptive adjustment when the port A on the network device is in the adaptive state.

During specific implementation, the network device may set the status of the port A on the network device to one of the adaptive state, the first locked state, and the second locked state according to the received configuration instruction. In one example, this embodiment of this application may further include: S21. The network device receives a first configuration instruction. S22. The network device sets the status of the port A to the adaptive state according to the first configuration instruction. In this case, the network device can perform the process shown in FIG. 3 or FIG. 4 to implement port mode adaptive adjustment. In another example, this embodiment of this application may further include: S31. The network device receives a second configuration instruction. S32. The network device sets the status of the port A to the first locked state according to the second configuration instruction. S33. The network device locks the mode of the port A to the FlexE interface mode when the port A is in the first locked state. In this case, the network device cannot perform the process shown in FIG. 3 or FIG. 4 to implement port mode adaptive adjustment. In still another example, this embodiment of this application may further include: S41. The network device receives a third configuration instruction. S42. The network device sets the status of the port A to the second locked state according to the third configuration instruction. S43. The network device locks the mode of the port A to the Ethernet interface mode when the port A is in the second locked state. Likewise, the network device in this case cannot perform the process shown in FIG. 3 or FIG. 4 to implement port mode adaptive adjustment.

The first configuration instruction, the second configuration instruction, and the third configuration instruction may be directly configured by technical personnel on the network device by using a command line or in another manner, or may be instructions sent to the network device by another device such as the network management device. The instructions are used to instruct the network device to set the port A on the network device to the adaptive state, the first locked state, and the second locked state, respectively.

In addition, in this embodiment of this application, the mode of the port A may further be switched according to configuration instructions configured by the technical personnel on the network device by using a command line or in another manner. In one example, this embodiment of this application may further include: S51. The network device receives a fourth configuration instruction. S52. The network device sets the mode of the port A to the Ethernet interface mode according to the fourth configuration instruction. Likewise, in another example, this embodiment of this application may further include: S61. The network device receives a fifth configuration instruction. S62. The network device sets the mode of the port A to the FlexE interface mode according to the fifth configuration instruction.

The fourth configuration instruction and the fifth configuration instruction may be directly configured by the technical personnel on the network device by using a command line or in another manner, or may be sent to the network device by another device such as the network management device. Either of the instructions is used to instruct the network device to forcedly configure the mode of the port A on the network device to a specific port mode.

Figure 5:
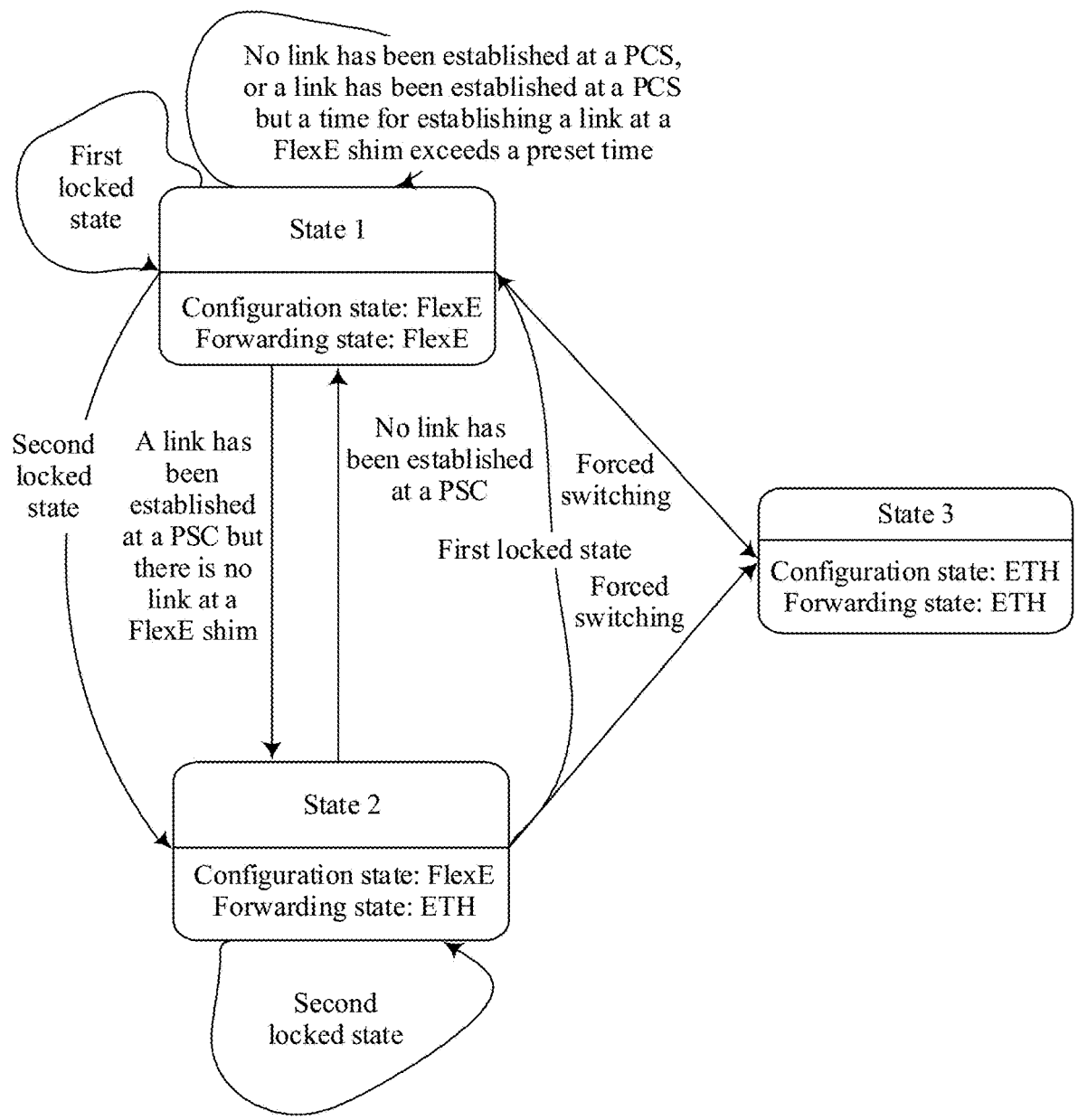
FIG. 5 is a schematic state transition diagram of three types of specified states according to an embodiment of this application.

For example, as shown in FIG. 5, three types of states may be set for a mode adaptation process of the port A: a FlexE interface adaptive state (referred to as a state 1 below), a FlexE interface adaptive state (referred to as a state 2 below), and an Ethernet interface state (referred to as a state 3 below). A configuration state and a forwarding state are configured for each type of states. The configuration state is a state set by the technical personnel. If a configuration state of the port A is "FlexE", the network device can perform mode adaptation on the port A by using the embodiment corresponding to FIG. 3 or FIG. 4, and determine a forwarding state of the port A. In this case, it indicates that the mode of the port A is a FlexE interface mode if the forwarding state is "FlexE", or it indicates that the mode of the port A is an Ethernet interface mode if the forwarding state is "Ethernet". Alternatively, if a configuration state of the port A is "Ethernet", a forwarding state of the port A may be locked to "Ethernet". To be specific, the mode of the port A on the network device is forcedly set to an Ethernet interface mode, and the network device cannot perform mode adaptation on the port A by using the embodiment corresponding to FIG. 3 or FIG. 4.

The state 1 is also denoted as an initial state or a default state of the port A, and is a default state of the port A after the network device is powered on. Both a configuration state and a forwarding state that are corresponding to the state 1 are "FlexE" by default. When the port A is in the state 1, the port A may implement, based on a FlexE interface mode, interworking with an interconnected port that is in a FlexE interface mode, and implement packet service configuration.

If the port A is in the state 1, when the network device detects that the link has been established at the PCS and that there is no link at the FlexE shim, the network device adaptively adjusts the mode of the port A to an Ethernet interface mode. In this case, the status of the port A is switched to the state 2. A configuration state corresponding to the state 2 is "FlexE" and a forwarding state corresponding to the state 2 is "Ethernet". When the port A is in the state 2, the port A may implement, based on an Ethernet interface mode, interworking with an interconnected port that is in an Ethernet interface mode, and implement packet service configuration.

The state 3 may be a state corresponding to a common Ethernet interface mode. When the port A is in the state 1 or the state 2, the technical personnel may manually switch the configuration state to "Ethernet" according to the fourth configuration instruction. In this case, the forwarding state is locked to "Ethernet".

Moreover, when the port A is in the state 3, the technical personnel may manually switch both the configuration state and the forwarding state to "FlexE" according to the fifth configuration instruction. In this case, the status of the port A is switched to the state 1. It should be noted that, when the port A is in the state 3, the network device does not support adaptation performed on the mode of the port A by using the embodiment shown in FIG. 3 or FIG. 4.

In one example, for a state transition process of the foregoing three types of states, refer to the following table:

| Source status | Target status | Transition condition | Design purpose (application scenario) |
| --- | --- | --- | --- |
| Stateless | State 1 | A network device is installed and powered on. | Initial state |
| State 1 | State 1 | No link has been established at a PCS, or a link has been established at a PCS but a time for establishing a link at a FlexE shim exceeds a preset time. | 1. There is no interconnected port in a FlexE interface mode. 2. A mode of a port interconnected with a port in the FlexE interface mode is a FlexE interface mode. |
| | State 1 | First locked state | A port mode is forcedly locked to a FlexE interface mode, regardless of a mode and a status of an interconnected port. |
| | State 2 | A link has been established at a PCS but no link has been established at a FlexE shim. | It is determined that an interconnected port is in an Ethernet interface mode, and forwarding plane mode adaptation is to be performed. |
| | State 2 | Second locked state | A port mode is forcedly locked to an Ethernet interface mode, regardless of a mode and a status of an interconnected port. |
| | State 3 | A current state is switched to the state 3. | A state corresponding to a port mode is forcedly switched to the state 3 on a premise that no packet service is configured on an original FlexE interface. |
| State 2 | State 1 | No link has been established at a PCS during a preset time. | A peer end is disconnected, for example, a fiber cut. |
| | State 1 | First locked state | A port mode is forcedly locked to a FlexE interface mode, regardless of a mode and a status of an interconnected port. |
| | State 2 | Second locked state | A port mode is forcedly locked to an Ethernet interface mode, regardless of a mode and a status of an interconnected port. |
| | State 3 | A current state is switched to the state 3. | A state corresponding to a port mode is forcedly switched to the state 3. |

-continued

| Source status | Target status | Transition condition | Design purpose (application scenario) |
|---|---|---|---|
| State 3 | State 1 | A current state is switched to the state 1. | A port mode is forcedly switched to a FlexE interface mode. |

After the network device is installed and powered on, a port on the network device, for example, the port A, is switched from "stateless" to the state 1.

For the source status being the state 1, in a first case, when no link has been established at the PCS of the port A on the network device, or when a link has been established at the PCS but a time for establishing a link at the FlexE shim exceeds a preset time (for example, 5 seconds), the port A remains in the state 1. In a second case, when the network device sets the status of the port A on the network device to the first locked state by using S31 to S33, the network device locks the mode of the port A to the FlexE interface mode, and no longer detects whether there is a link at each layer, that is, no longer concerns about the mode of the port B interconnected with the port A. In a third case, when the link has been established at the PCS of the port A on the network device but there is no link at the FlexE shim of the port A on the network device, the network device determines that the mode of the port B interconnected with the port A is the Ethernet interface mode. Then, the network device may set the forwarding state of the port A to "Ethernet" by using step 301 and step 302 (or step 401 and step 402), that is, switch the status of the port A to the state 2. In a fourth case, when the network device locks the status of the port A on the network device to the second locked state by using S41 to S43, the network device forcedly switches the mode of the port A to the Ethernet interface mode (that is, switches the forwarding state of the port A to "Ethernet"). In this case, the port A is in the state 2, and the network device no longer detects whether there is a link at each layer, that is, no longer concerns about the mode of the port B interconnected with the port A. In a fifth case, the network device forcedly switches the status of the port A on the network device to the state 3 by using S51 and S52.

For the source status being the state 2, in a first case, when a time during which no link has been established at the PCS of the port A on the network device exceeds a preset time (for example, 3 seconds), it is considered that the port B interconnected with the port A is disconnected, for example, a fiber cut occurs. Then, the network device may restore the forwarding state of the port A to "FlexE" by using step 403, that is, switch the status of the port A back to the state 1. In a second case, when the network device sets the status of the port A on the network device to the first locked state by using S31 to S33, the network device forcedly switches the mode of the port A to the FlexE interface mode. In this case, the port A is in the state 1, and the network device no longer detects whether there is a link at each layer, that is, no longer concerns about the mode of the port B interconnected with the port A. In a third case, when the network device sets the status of the port A on the network device to the second locked state by using S41 to S43, the network device locks the mode of the port A to the Ethernet interface mode, and no longer detects whether there is a link at the PCS or at the FlexE shim, that is, no longer concerns about the mode of the port B interconnected with the port A. In a fourth case, the network device forcedly configures the status of the port A on the network device to the state 3 by using S51 and S52, when no packet service is configured on a FlexE interface of the port A on the network device.

For the source status being the state 3, the network device may forcedly configure the status of the port A on the network device to the state 1 by using S61 and S62. A premise of the forced configuration is that no packet service is configured on an Ethernet interface of the port A on the network device.

In can be learnt that, mode adaptation of the port A can be implemented by setting the foregoing three types of states on the network device, to ensure that the port A on the network device can use a same mode as the port B interconnected with the port A, so that the network device can automatically communicate with another network device. When the peer device is the network management device, the network management device can automatically identify and manage the network device in the network.

To make the port mode adaptation method provided in this embodiment of this application clearer, with reference to the accompanying drawings, the following describes some corresponding examples in the embodiments of this application by using a process of performing port mode adaptation adjustment between a network device 1 and a network device 2 that are directly connected to each other as an example.

Figure 6:
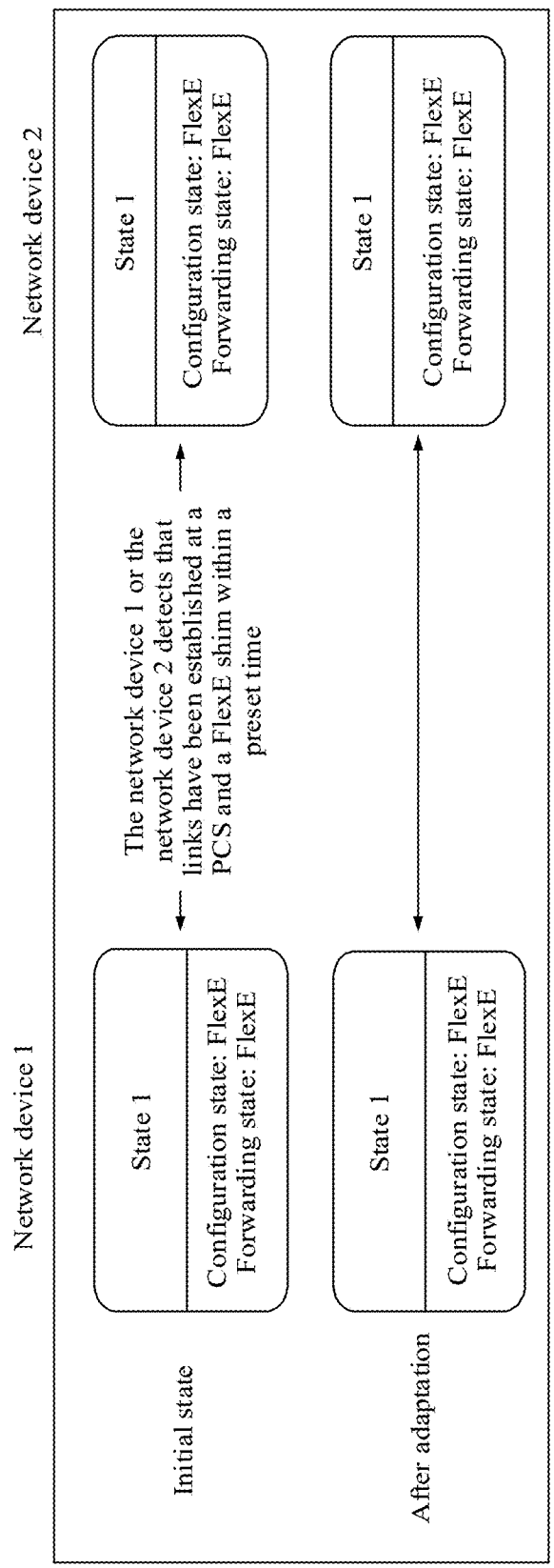
FIG. 6 is a schematic diagram of an example of a port mode adaptation method according to an embodiment of this application.

Referring to FIG. 6, if ports on the network device 1 and the network device 2 are both in an adaptive state and are both in a default state 1 currently, both the network device 1 and the network device 2 detect that links have been established at a PCS and a FlexE shim within a preset time. After the network device 1 and the network device 2 perform port mode adaptation, statuses of interconnected ports remain the state 1, that is, configuration states and forwarding states of both the ports are "FlexE".

Figure 7:
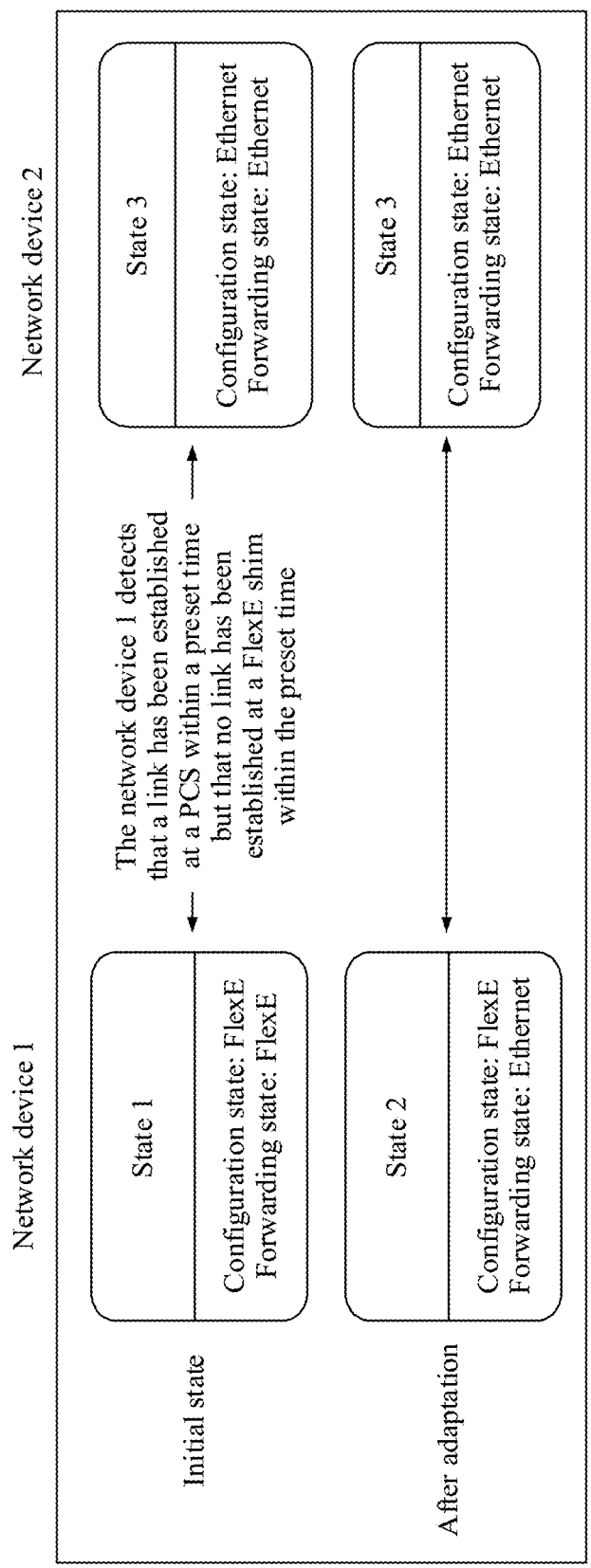
FIG. 7 is a schematic diagram of another example of a port mode adaptation method according to an embodiment of this application.

Referring to FIG. 7, if a port on the network device 1 is in an adaptive state and a state 1 currently, and a port on the network device 2 is in a state 3 currently, the network device 1 sets a forwarding state of the port on the network device 1 to "Ethernet" by using step 301 and step 302. In other words, a status of the port on the network device 1 is set to a state 2.

Figure 8:
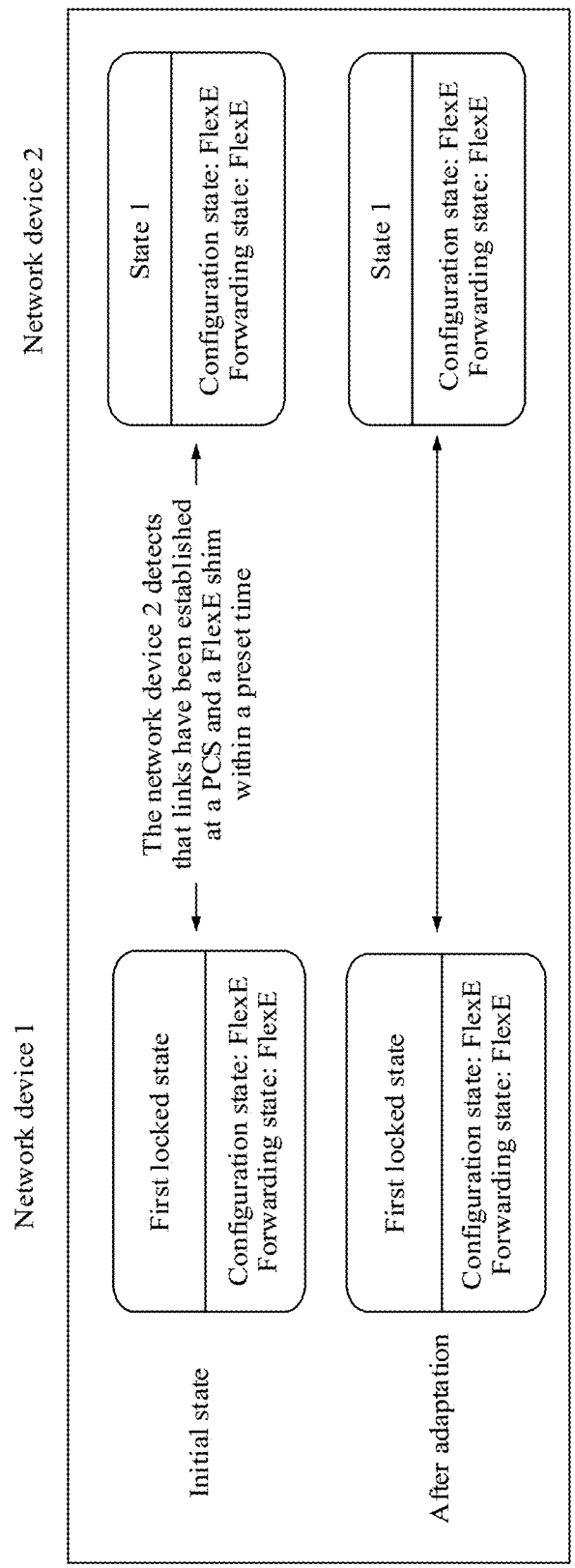
FIG. 8 is a schematic diagram of yet another example of a port mode adaptation method according to an embodiment of this application.

Referring to FIG. 8, if a port on the network device 1 is in a first locked state currently, and a port on the network device 2 is in a state 1 currently, the network device 2 can detect that links have been established at a PCS and a FlexE shim within a preset time. After the network device 2 performs port mode adaptation, a status of the port on the network device 2 remains the state 1, that is, both a configuration state and a forwarding state of the network device 2 are "FlexE".

Figure 9:
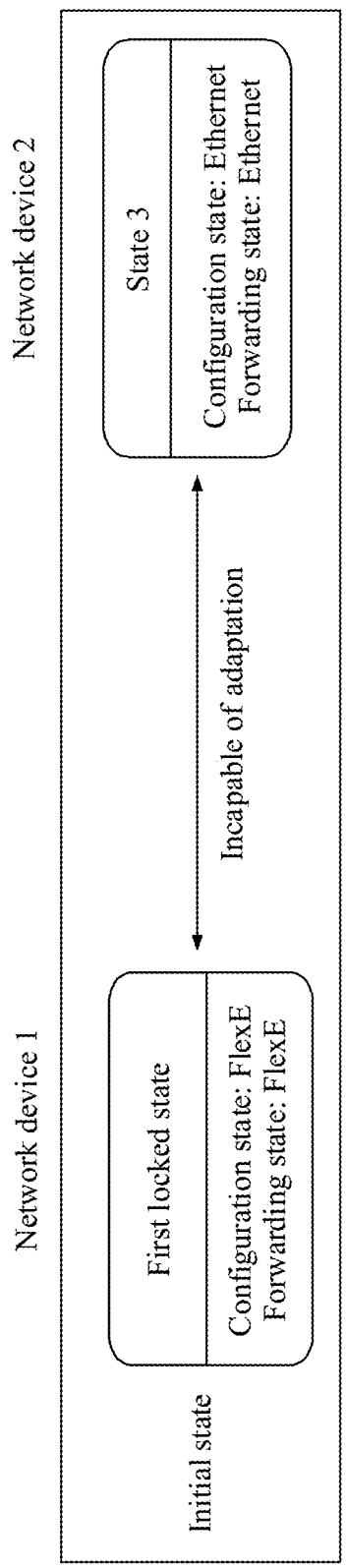
FIG. 9 is a schematic diagram of still another example of a port mode adaptation method according to an embodiment of this application.

Referring to FIG. 9, if a port on the network device 1 is in a first locked state currently, and a port on the network device 2 is in a state 3 currently, neither the first network device 1 nor the second network device 2 needs to detect or concern about a port mode of the other party. This is because in this scenario, neither the network device 1 nor the network device 2 can implement port mode adaptation.

Figure 10:
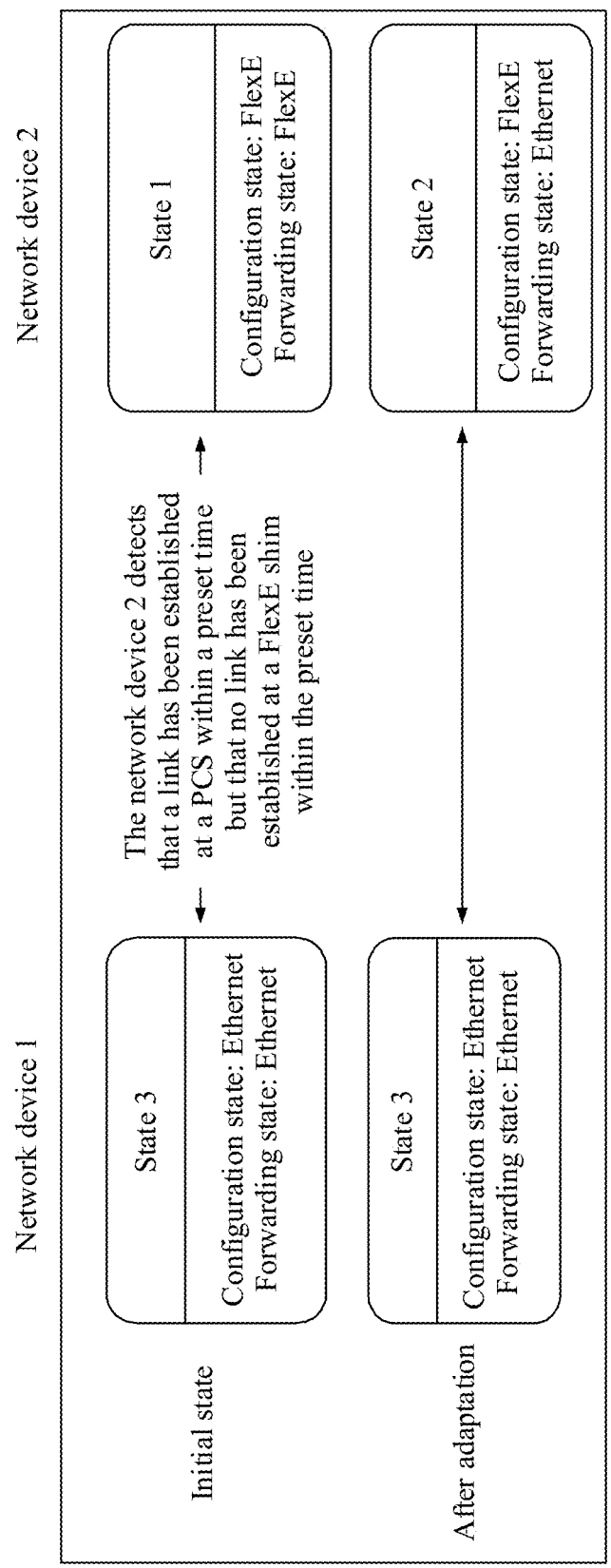
FIG. 10 is a schematic diagram of another example of a port mode adaptation method according to an embodiment of this application.

Referring to FIG. 10, if a port on the network device 1 is in a state 3 currently, and a port on the network device 2 is in a state 1 currently, the network device 2 can detect that a link has been established at a PCS within a preset time but that no link has been established at a FlexE shim within the preset time. After the network device 2 performs port mode adaptation, the network device 2 switches a mode of the port on the network device 2 to an Ethernet interface mode, so that a status of the port on the network device 2 is switched to a state 2, that is, a configuration state and a forwarding state of the network device 2 are "FlexE" and "Ethernet", respectively.

Figure 11:
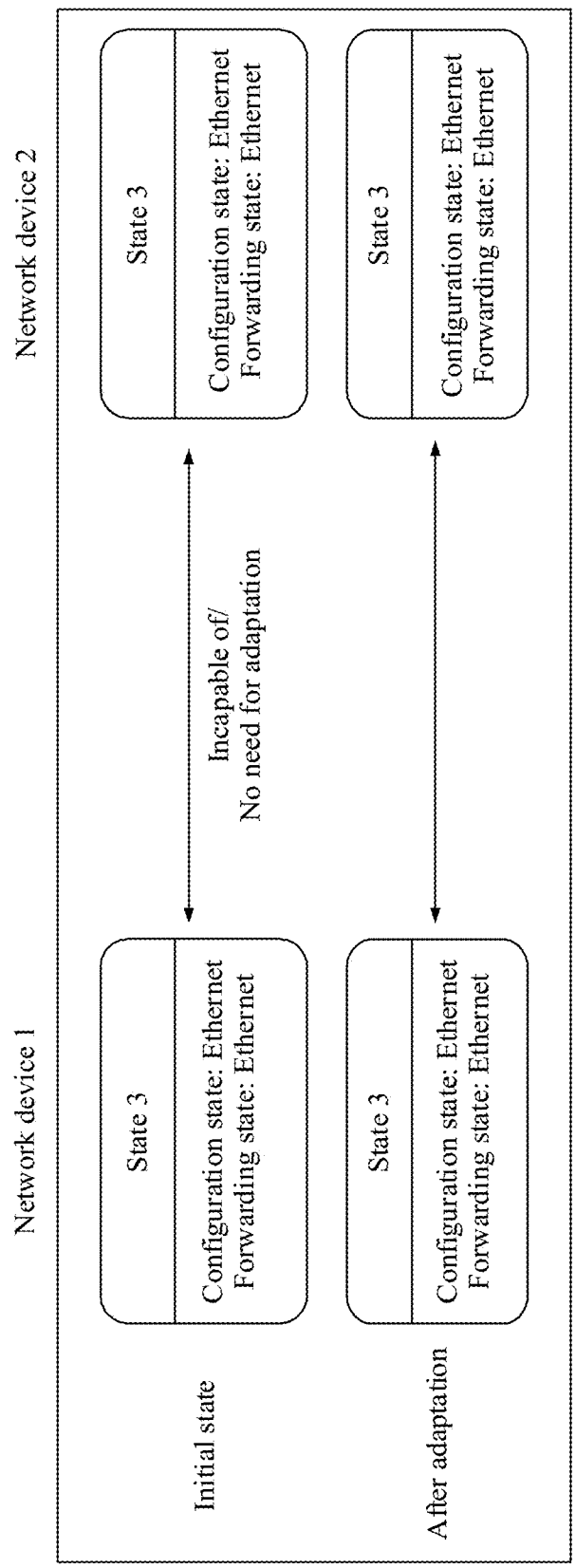
FIG. 11 is a schematic diagram of still another example of a port mode adaptation method according to an embodiment of this application.

Referring to FIG. 11, if ports on the network device 1 and the network device 2 are both in a state 3 currently, the network device 1 and the network device 2 cannot perform port mode adaptation and do not need to perform port mode adaptation either. In this case, the network device 1 and the network device 2 can communicate with each other through the ports whose interconnected-port modes are Ethernet interface modes.

It should be noted that the foregoing examples are merely used to describe, in some scenarios, the port mode adaptation methods provided in the embodiments of this application, and the embodiments of this application are applicable to scenarios including but not limited to the foregoing scenarios.

Figure 12:
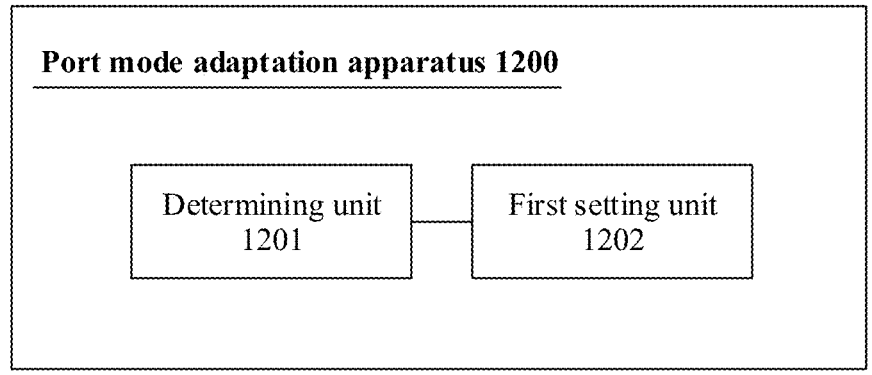
FIG. 12 is a schematic structural diagram of a port mode adaptation apparatus according to an embodiment of this application.

FIG. 12 is a schematic structural diagram of a port mode adaptation apparatus 1200 according to an embodiment of this application. The apparatus 1200 includes a determining unit 1201 and a first setting unit 1202. The determining unit 1201 is configured to determine a status of a port on the network device. The first setting unit 1202 is configured to set a mode of the port to an Ethernet interface mode if the status of the port satisfies a first condition. The first condition includes: the mode of the port is a Flexible Ethernet FlexE interface mode, and there is no link at a FlexE shim of the port.

In some embodiments, the first condition further includes: a link has been established at a PCS of the port.

In some other embodiments, the apparatus 1200 further includes a switching unit. The switching unit is configured to switch the mode of the port from the Ethernet interface mode to the FlexE interface mode if the status of the port satisfies a second condition. The second condition includes: the mode of the port is the Ethernet interface mode, and there is no link at the PCS of the port.

In still some other embodiments, the first condition further includes: the port is in an adaptive state, and the second condition further includes: the port is in the adaptive state.

In yet some other embodiments, the apparatus 1200 further includes a first receiving unit and a second setting unit. The first receiving unit is configured to receive a first configuration instruction. The second setting unit is configured to set the status of the port to the adaptive state according to the first configuration instruction.

In some other embodiments, the apparatus 1200 further includes a second receiving unit, a third setting unit, and a first locking unit. The second receiving unit is configured to receive a second configuration instruction. The third setting unit is configured to set the status of the port to a first locked state according to the second configuration instruction. The first locking unit is configured to lock the mode of the port to the FlexE interface mode when the port is in the first locked state.

In some other embodiments, the apparatus 1200 further includes a third receiving unit, a fourth setting unit, and a second locking unit. The third receiving unit is configured to receive a third configuration instruction. The fourth setting unit is configured to set the status of the port to a second locked state according to the third configuration instruction. The second locking unit is configured to lock the mode of the port to the Ethernet interface mode when the port is in the second locked state.

In some other embodiments, the apparatus 1200 further includes a fourth receiving unit and a first configuration unit. The fourth receiving unit is configured to receive a fourth configuration instruction. The first configuration unit is configured to set the mode of the port to the Ethernet interface mode according to the fourth configuration instruction.

In some other embodiments, the apparatus 1200 further includes a fifth receiving unit and a second configuration unit. The fifth receiving unit is configured to receive a fifth configuration instruction. The second configuration unit is configured to set the mode of the port to the FlexE interface mode according to the fifth configuration instruction.

It can be understood that, for specific implementations of the apparatus 1200 shown in FIG. 12, refer to the descriptions of the embodiments shown in FIG. 3 and FIG. 4. Details are not described in this embodiment again.

Figure 13:
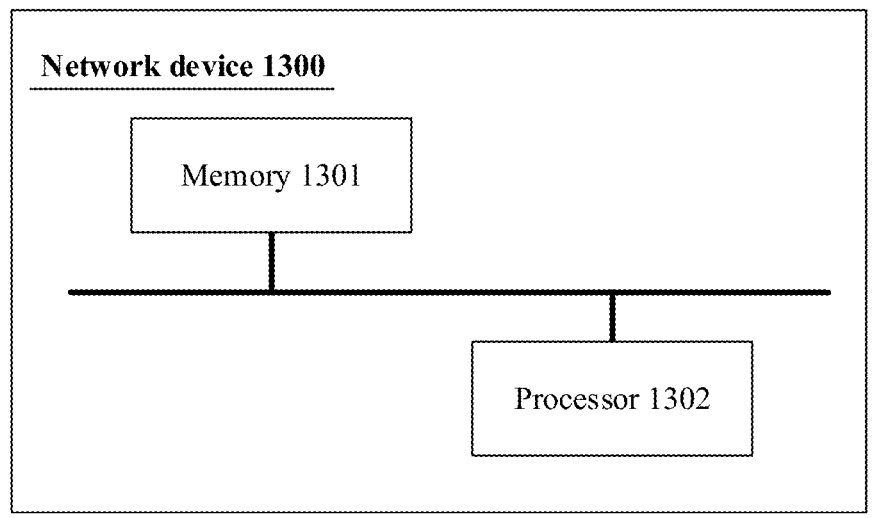
FIG. 13 is a schematic structural diagram of a network device according to an embodiment of this application.

In addition, an embodiment of this application further provides a network device. As shown in FIG. 13, the network device 1300 includes a memory 1301 and a processor 1302. The memory 1301 is configured to store program code. The processor 1302 is configured to run instructions in the program code, so that the network device 1300 performs the port mode adaptation method in any one of the implementations in the methods shown in FIG. 3 and FIG. 4.

Moreover, an embodiment of this application further provides a computer program product. When the computer program product is run on a computer, the computer is enabled to perform the port mode adaptation method in any one of the implementations in the methods shown in FIG. 3 and FIG. 4.

Further, an embodiment of this application further provides a computer-readable storage medium. The computer-readable storage medium stores instructions. When the instructions are run on a computer or a processor, the computer or the processor is enabled to perform the port mode adaptation method in any one of the implementations in the methods shown in FIG. 3 and FIG. 4.

"First" in terms such as "first configuration instruction" and "first condition" mentioned in the embodiments of this application is merely used to identify names, but is not used to indicate the first one in terms of sequences. The rule is also applicable to "second" and so on.

From the foregoing descriptions of the implementations, a person skilled in the art can clearly understand that all or some steps of the methods in the embodiments can be implemented by software in addition to a general hardware platform. Based on such an understanding, the technical solutions in this application may be implemented in a form of a software product. The software product may be stored in a storage medium, such as a read-only memory (ROM)/random-access memory (RAM), a magnetic disk, or an optical disc, and includes several instructions for instructing a computer device (which may be a personal computer, a server, or a network communications device such as a router) to perform the methods described in the embodiments or some parts of the embodiments of this application.

The embodiments in this specification are all described in a progressive manner. For same or similar parts in the embodiments, refer to these embodiments, and each embodiment focuses on a difference from other embodiments. In particular, because the apparatus embodiment and the device embodiment are basically similar to the method embodiments, the apparatus embodiment and the device embodiment are described relatively simply, and for related parts of the apparatus embodiment and the device embodiment, reference is made to a part of the descriptions of the method embodiments. The device embodiment and the apparatus embodiment that are described above are merely examples. The modules described as separate parts may or may not be physically separate, and parts displayed as modules may or may not be physical modules, may be located in one position, or may be distributed on a plurality of network units. Some or all of the modules may be selected depending on actual requirements to achieve the objectives of the solutions in the embodiments. A person of ordinary skill in the art can understand and implement the embodiments without creative efforts.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A port mode adaptation method implemented by a network device, the port mode adaptation method comprising:
    determining a status of a port on the network device; and
    setting a mode of the port to an Ethernet interface mode when the status satisfies a first condition,
    wherein the first condition comprises the mode of the port is a Flexible Ethernet (FlexE) interface mode and there is no link at a Flexible Ethernet (FlexE) shim of the port.

2. The port mode adaptation method of claim 1, wherein the first condition further comprises a link has been established at a physical coding sublayer (PCS) of the port.

3. The port mode adaptation method of claim 2, further comprising switching the mode of the port from the Ethernet interface mode to the FlexE interface mode when the status satisfies a second condition, wherein the second condition comprises the mode of the port is the Ethernet interface mode and there is no link at the PCS of the port.

4. The port mode adaptation method of claim 3, wherein the first condition further comprises the port is in an adaptive state, and wherein the second condition further comprises the port is in the adaptive state.

5. The port mode adaptation method of claim 4, further comprising:
    receiving a configuration instruction; and
    setting the status to the adaptive state according to the configuration instruction.

6. The port mode adaptation method of claim 4, further comprising:
    receiving a configuration instruction;
    setting the status of the port to a locked state according to the configuration instruction; and
    locking the mode of the port to the FlexE interface mode when the port is in the locked state.

7. The port mode adaptation method of claim 4, further comprising:
    receiving a configuration instruction;
    setting the status of the port to a locked state according to the configuration instruction; and
    locking the mode of the port to the Ethernet interface mode when the port is in the locked state.

8. The port mode adaptation method of claim 1, further comprising:
    receiving a configuration instruction; and
    setting the mode of the port to the Ethernet interface mode according to the configuration instruction.

9. The port mode adaptation method of claim 1, further comprising:
    receiving a configuration instruction; and
    setting the mode of the port to the FlexE interface mode according to the configuration instruction.

10. A port mode adaptation apparatus comprising:
    a memory configured to store instructions; and
    a processor coupled to the memory and configured to execute the instructions to cause the port mode adaptation apparatus to:
        determine a status of a port on a network device; and
        set a mode of the port to an Ethernet interface mode when the status satisfies a first condition,
        wherein the first condition comprises the mode of the port is a Flexible Ethernet (FlexE) interface mode and there is no link at a Flexible Ethernet (FlexE) shim of the port.

11. The port mode adaptation apparatus of claim 10, wherein the first condition further comprises a link has been established at a physical coding sublayer (PCS) of the port.

12. The port mode adaptation apparatus of claim 11, wherein the processor is further configured to cause the port mode adaptation apparatus to switch the mode of the port from the Ethernet interface mode to the FlexE interface mode when the status satisfies a second condition, wherein the second condition comprises the mode of the port is the Ethernet interface mode and there is no link at the PCS of the port.

13. The port mode adaptation apparatus of claim 12, wherein the first condition further comprises the port is in an adaptive state, and wherein the second condition further comprises the port is in the adaptive state.

14. The port mode adaptation apparatus of claim 13, wherein the processor is further configured to cause the port mode adaptation apparatus to:
    receive a configuration instruction; and
    set the status to the adaptive state according to the configuration instruction.

15. The port mode adaptation apparatus of claim 13, wherein the processor is further configured to cause the port mode adaptation apparatus to:
    receive a configuration instruction;
    set the status to a locked state according to the configuration instruction; and
    lock the mode of the port to the FlexE interface mode when the port is in the locked state.

16. The port mode adaptation apparatus of claim 13, wherein the processor is further configured to cause the port mode adaptation apparatus to:
    receive a configuration instruction;
    set the status to a locked state according to the configuration instruction; and
    lock the mode of the port to the Ethernet interface mode when the port is in the locked state.

17. The port mode adaptation apparatus of claim 10, wherein the processor is further configured to cause the port mode adaptation apparatus to:
   receive a configuration instruction; and
   set the mode of the port to the Ethernet interface mode according to the configuration instruction.

18. The port mode adaptation apparatus according to claim 10, wherein the processor is further configured to cause the port mode adaptation apparatus to:
   receive a configuration instruction; and
   set the mode of the port to the FlexE interface mode according to the configuration instruction.

19. A computer program product comprising instructions that are stored on a computer-readable medium and that, when executed by a processor, cause a network device to:
   determine a status of a port on the network device; and
   set a mode of the port to an Ethernet interface mode when the status satisfies a first condition,
   wherein the first condition comprises the mode of the port is a Flexible Ethernet (FlexE) interface mode and there is no link at a Flexible Ethernet (FlexE) shim of the port.

20. The computer program product of claim 19, wherein the first condition further comprises a link has been established at a physical coding sublayer (PCS) of the port.

\* \* \* \* \*